July 14, 1925.  W. HEAPE ET AL  1,545,898
CINEMATOGRAPH CAMERA
Filed Sept. 12, 1921
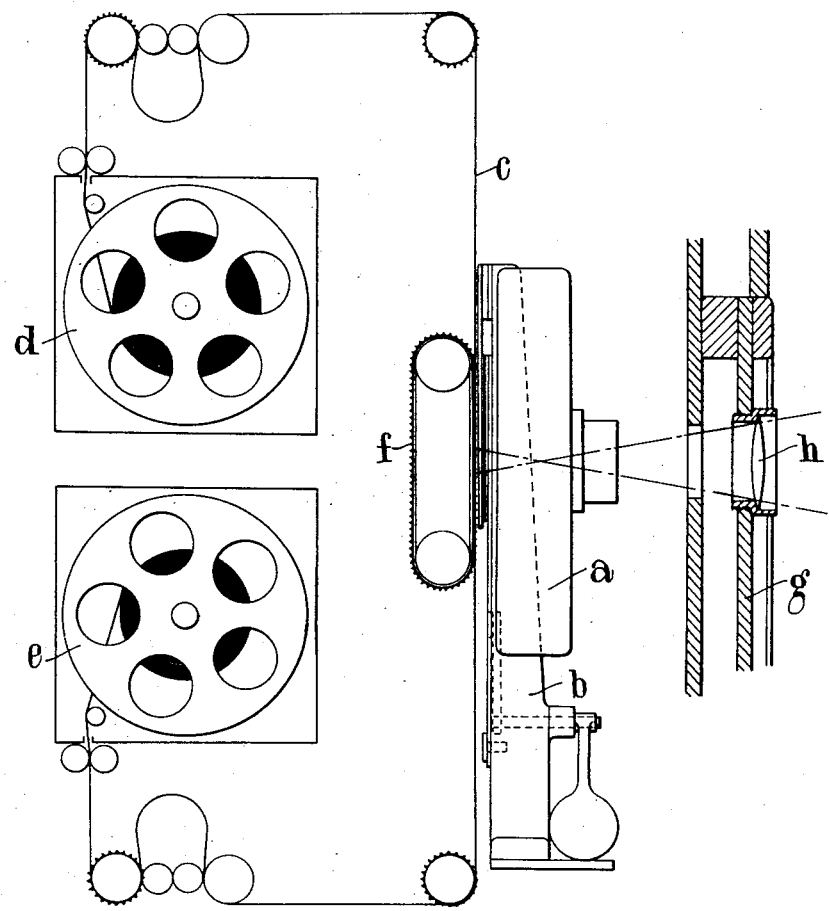
Inventors
W. Heape
H.B. Grylls
By Marks & Clerk
Attys.

Patented July 14, 1925.

1,545,898

UNITED STATES PATENT OFFICE.

WALTER HEAPE, OF LONDON, AND HORACE B. GRYLLS, OF EASTBOURNE, ENGLAND.

CINEMATOGRAPH CAMERA.

Application filed September 12, 1921. Serial No. 500,055.

*To all whom it may concern:*

Be it known that we, WALTER HEAPE, F. R. S., a subject of the King of Great Britain and Ireland, and residing at 10 King's Bench Walk, Temple, London, E. C. 4, England, and HORACE BERE GRYLLS, a subject of the King of Great Britain and Ireland, and residing at Trenay Fawton, Carew Road, Eastbourne, in the county of Sussex, England, have invented certain new and useful Improvements in or Relating to Cinematograph Cameras, of which the following is a specification.

This invention relates to cinematograph cameras.

In the specification of our prior British Patent No. 156811, we have described apparatus of this type in which the photograph is taken on a film stretched round the circumference of a drum, and in which a number of lenses are mounted on a disc rotating about an axis at right angles to that of the drum, the speeds of rotation of the disc and drum being such that the image thrown by the operating lens on to the portion of the film on which the photograph is being taken moves at the same speed as the film.

In such apparatus difficulties may arise in altering the focus of the apparatus, as the movement of the lenses for adjustment is apt to be troublesome.

Further, although the image of the object at a considerable distance from the apparatus moves at the same rate as the moving film, and hence has no appreciable relative motion to it, this is not true with near objects, for in such cases the change of position of the operating lens and film relative to the objects is sufficiently great to alter materially the view-point during such exposure and so produce a blurred image.

One object of the present invention is to construct the apparatus in such a manner that focussing on an object is possible at any distance from the camera, and to obviate the blurring of the image caused by the shifting of the view-point.

In the apparatus described in our aforesaid British patent application, the film is mounted on a drum of considerable diameter, so that the whole series of photographs required are aken during one or two revolutions of the drum, the film being fixed in position thereon and not removed therefrom until all the photographs of one series have been taken. This involves the use of a very large drum, and a further object of the invention is to render the apparatus portable by providing a plurality of supports for the film so that it may be made to travel in the required path, and at the requisite speed by transference from one support to another.

The invention also consists in a camera of the type described in which an additional stationary, through possibly adjustable, lens or lenses is or are used with the rotating lens system for the purpose of focussing at any desired distance.

The invention further consists in a portable camera of the type described in which suitable means are employed for passing the film from one spool to another over the rotating drum or through the desired path.

The invention further consists in other details and arrangements hereinafter described or indicated.

The accompanying drawing illustrates more or less diagrammatically one convenient arrangement of apparatus in accordance with the invention.

In carrying our invention into effect in one convenient manner, we provide a rotary lens system *a* which may be a similar construction to that described in the beforementioned specification, and which is adapted to be rotated by bevel wheels or other means from a suitable prime mover, the mounting of the lenses and the means for rotating the same being such that it is possible to take photographs at high speeds, for example, at any speed up to say 10,000 per second or higher. A shutter mechanism *b*, such as is described in the before-mentioned specification, or any other convenient form of shutter device or mechanism may be employed, and the rotary lens system is properly positioned, in relation to the film *c*, which in the example illustrated, is arranged more or less in accordance with usual cinematograph practice to travel from one spool *d* to a second spool *e*, and to pass over suitably arranged intermediate sprockets or rollers.

As a machine in accordance with this invention may be required to operate at considerable speeds at which electrification of the film might be set up if the film were made to travel over a stationary support, we may provide endless bands, belts, or tracks *f*, at the edges of the films having pins or projections thereon engaging with apertures in the film or being otherwise suitably formed, in order to constitute a moving carrier for the film, which will maintain the same in proper relationship to the lenses without providing for any fixed abutment, gate or like mechanism with which the film is in moving contact.

It will be understood, however, that where the difficulty referred to is not likely to arise, the film may be carried by any suitable fixed plates or gate mechanism.

In front of the rotating lens system there is provided a suitable frame $g$, in which one or more stationary focussing lenses $h$ may be placed so that when such stationary lenses are employed the lens of the camera becomes a compound lens consisting of one or more stationary lenses and a rotating lens or lenses carried by the disc or wheel or other means provided for furnishing the rotary lens system.

For stereoscopic purposes or for photographing at a rate double that possible with a single rotary lens system, two of such systems may be provided in the manner described in British specification No. 758 of 1916. The size of any such stationary lens as is employed should be such that at the position at which it is placed relatively to the rotating lenses its field is at least sufficient to use the full aperture of the operating rotating lens throughout its entire period of action.

In a fixed instrument such as that described in our specification above referred to, the rotating lenses may be of ½″ diameter and 2″ focus with F 4 aperture, the film being of standard size giving photographs 1″ in width and 0.75″ in length, but it will be understood that these sizes are given by way of example and not of limitation.

It will further be understood that the details of construction are given only by way of example as it will be obvious that there are numerous ways in which the film may be carried in proper relation to the rotary lens system, as for example we may provide one or more drums for this purpose or we may arrange for the film to pass outside a ring of lenses and to be lighted by a prism or other means arranged inside the ring of lenses, or we may arrange for the film to pass inside a ring of lenses in a suitable path, and we may modify the path of the film, the means for providing and operating the rotary lens system or systems, and the means for driving or for allowing movement of the movable film supporting track when such is employed, all as may be found most convenient to suit any particular practical requirements that may have to be fulfilled.

Having now described our invention what we claim as new and desire to secure by Letters Patent is:—

1. A cinematograph camera comprising in combination a single rotary member carrying a plurality of lenses, a plurality of supports for a sensitive film, means for moving said film by transference from one support to another so that the portion of the film receiving the image formed by a lens moves at the same velocity and in the same direction as the image formed by the lens, a track movable with said film for passing the same in correct relationship to the rotary lens system and a shutter device for controlling the exposure of the film.

2. A cinematograph camera comprising in combination a single rotary lens system, a spool from which a sensitive film may be moved past the lens system so that the portion of the film receiving an image formed by a lens moves at the same velocity and in the same direction as the image formed by the lens, a take-up spool on to which the exposed film may be wound, a focussing lens system and a track movable with said film for passing the same in correct relationship to the rotary lens system.

3. A cinematograph camera comprising in combination a single rotary lens system, a spool from which a sensitive film may be moved past the lens system so that the portion of the film receiving an image formed by a lens moves at the same velocity and in the same direction as the image formed by the lens, a take-up spool on to which the exposed film may be wound, a focussing lens system, a track movable with said film for passing the same in correct relationship to the rotary lens system, and a shutter device for controlling the exposure of said film.

In testimony whereof we have signed our names to this specification.

WALTER HEAPE.
HORACE B. GRYLLS.